Figure 1:
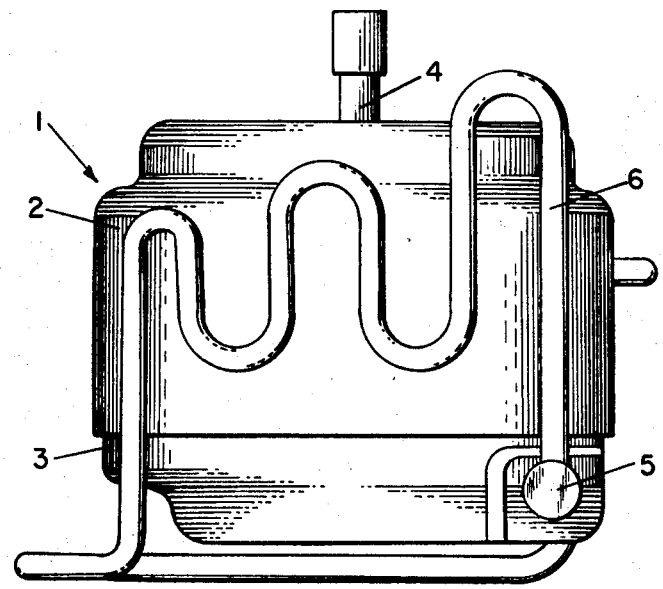

United States Patent

[11] 3,604,101

| | | |
|---|---|---|
| [72] | Inventor | Bent Melchior Karlsen Holme Humbaek P, Skovby, Denmark |
| [21] | Appl. No. | 865,249 |
| [22] | Filed | Oct. 10, 1969 |
| [45] | Patented | Sept. 14, 1971 |
| [73] | Assignee | Danfoss A/S Nordborg, Denmark |
| [32] | Priority | Oct. 10, 1968 |
| [33] | | Germany |
| [31] | | P 18 03 794.0 |

[54] CONNECTION BETWEEN SHEET-METAL SOUND-ABSORBER AND A PIPE
5 Claims, 3 Drawing Figs.

[52] U.S. Cl. .................................................. 29/471.7,
29/471.1, 165/178
[51] Int. Cl. ...................................................... B23k 31/02
[50] Field of Search ........................................... 29/471.1,
471.7, 497; 165/178

[56] References Cited
UNITED STATES PATENTS

| 3,310,868 | 3/1967 | La Porte et al. ............... | 29/471.1 X |
| 3,310,869 | 3/1967 | La Porte et al. ............... | 29/471.1 X |
| 3,349,465 | 10/1967 | La Pan et al. ................. | 29/471.7 X |

*Primary Examiner*—John F. Campbell
*Assistant Examiner*—Richard Bernard Lazarus
*Attorney*—Wayne B. Easton

ABSTRACT: The invention relates to a method for making a connection between a pressure pipe and a sheet metal panel of a refrigeration unit pressure sound-absorber. The connection includes a first annularly shaped part soldered to the sheet metal panel. A second part having intersecting right-angle passages has the pressure pipe soldered thereto in alignment with one of the passages. The two parts are then joined by resistance pressure-welding and the pressure pipe is thereafter bent to a desired shape and welded into position relative to the sound absorber.

PATENTED SEP 14 1971

3,604,101

CONNECTION BETWEEN SHEET-METAL SOUND-ABSORBER AND A PIPE

The invention relates to a connection between a sheet metal sound-absorber and a pipe, and in particular between the pressure sound-absorber and the pressure pipe of an encased refrigerator.

In mass production operations difficulties arise in soldering a pipe, e.g. a copper pipe, directly into a sheet metal sound-absorber. The soldering must be carried out while the other parts of the sheet metal sound-absorber are being soldered together, since otherwise the other soldered joints could become loosened. However, this soldering operation takes place in a soldering furnace through which the pipe cannot be passed, firstly because it occupies too much space and secondly because it would lose its shape. Therefore, when making a connection between a pressure sound-absorber and the pressure pipe of an encased refrigerator, the procedure has been firstly to solder a union made of a material similar to that of the pipe into the sheet metal wall and, only after this has been done, to weld the pressure pipe, previously bent to a zigzag or like form, into the union with the help of a soldering flame and silver solder. This is a manual operation which very considerably reduces the possibility of using mass production methods. Furthermore it is virtually impossible to carry out the soldering in such a way that the pressure pipe is precisely positioned relative to the sound-absorber, so that in the majority of cases subsequent alignment by bending has hitherto been unavoidable.

The object of the invention is to provide a connection of the initially described kind which is better suited to a mass production system and which nevertheless enables the pipe and the sound-absorber to be accurately positioned relatively to each other.

According to the invention, this object is achieved by soldering a first connecting part to the sheet metal wall of the sound-absorber and a second connecting part to the pipe and by connecting the two connecting parts together by resistance pressure welding.

The first connecting part can be soldered on when the sheet metal sound-absorber is soldered up and passed through a soldering furnace. The second connecting part can likewise be readily soldered on to a pressure pipe during passage through a soldering furnace, and can, for example, be soldered on to a straight horizontal length of pipe. The last step in making the connection, i.e. the resistance pressure welding, is simply achieved by pressing one of the two connecting parts on to the other. This involves heating only at the point of contact, so that the soldered points are not endangered. During the resistance welding, the two connecting parts can be aligned with each other in a tool, so that the required relative position of the pipe and the sound-absorber is achieved in a precise manner.

One of the connecting parts preferably has a conical surface and the other connecting part an edge cooperating therewith. This results in an initial line contact during welding and therefore in a very good weld. Furthermore, the two connecting parts can be rotated relatively to each other so that it is easy to achieve correct alignment.

The connecting parts can preferably be made of free-cutting steel. This not only makes it easier to manufacture the connecting parts on an automatic lathe, but such free-cutting steel can be very readily soldered and, in particular, welded.

In a preferred embodiment, the pipe is introduced laterally into the second connecting part. Thus, one end face of the connecting part is unoccupied so that a welding electrode can be applied over a large area so as to provide electric power and the necessary pressure. The other electrode can be applied at any point on the sheet metal sound-absorber, preferably at a point opposite the connection.

According to the invention, a method for making the connection is characterized in that the pipe is first soldered to the second connecting part, then bent and thereafter correctly positioned relatively to the sound-absorber, after which welding is carried out. The bending of the pipe is thus carried out after the soldering operations, so that the required shape can be accurately imparted to the pipe. Thus, during the positional adjustment, it is only necessary to take care that the angular position relative to the sound-absorber is correct.

Figure 2:
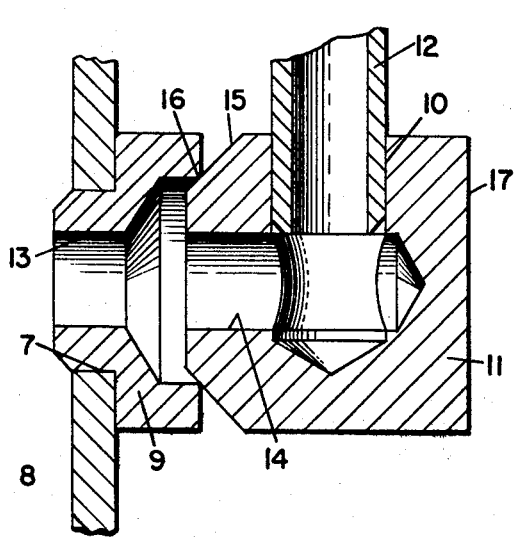
Figure 3:
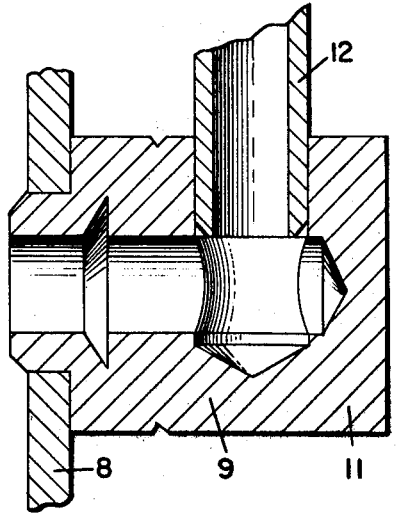

The invention will now be described in greater detail by reference to an embodiment illustrated in the drawing, in which:

FIG. 1 shows a side view of a pressure sound-absorber with a connecting pressure pipe, FIG. 2 shows, on a larger scale, a section through the joint between the sound-absorber and the pipe prior to welding, and FIG. 3 is the same illustration after welding has taken place.

A pressure sound-absorber 1 consists of a number of interconnected sheet metal parts, e.g. 2 and 3. It has an inlet port 4 whereby it is connected to the pressure valve chamber of a compressor, and a connection 5 by means of which is connected a pressure pipe 6 bent in the normal manner to zigzag form.

The connection is made in the following manner. A first connecting part 9 is soldered into a hole 7 stamped in a sheet metal wall 8. The end 12 of the pressure pipe is soldered into a radially extending bore 10 of a second connecting part 11. Both connecting parts 9 and 11 are of substantially symmetrical form with respect to rotation and have central bores 13 and 14. The second connecting part has a conical surface 15, which cooperates with an edge 16 on the first connecting part 9. The outer end face 17 of the second connecting part 11 is unoccupied.

If an electrode of a welding machine is now applied with appropriate pressure to this unoccupied end face 17 while the counterelectrode supports the sheet metal sound-absorber on the opposite side, considerable heat is developed along the line of contact between the edge 16 and the conical surface 15, and this leads to the welding up of the two connecting parts 9 and 11 until finally the form illustrated in FIG. 3 is obtained.

Because the connecting part 9 presents rotation symmetry, it is immaterial how this is soldered into the sheet metal wall 8. Similarly, there is no problem in soldering the end 12 of the pipe into the connecting part 11. If, after soldering, the pipe 6 is bent in the required manner, then it is only necessary, during welding, to take care that the angle between the connecting parts 9 and 11 is correct. This can be done with the help of a simple tool.

In one construction for example, the sheet metal sound-absorber was made of steel sheet, the connecting parts of free-cutting steel and the pressure pipe of copper.

I claim:

1. A method of connecting a pipe to a sheet metal panel of a refrigerator unit pressure sound-absorber comprising the steps of forming a circular hole in said panel, forming an annularly shaped first part, forming a second part having first and second intersecting passages, soldering said first part to said panel in concentric relation to said hole thereof, inserting a pipe into said first passage and attaching it to said second part by soldering, attaching said second part to said first part by resistance pressure-welding with second passage in alignment with said hole.

2. A method according to claim wherein said first part is formed with a circular edge, said second first part is formed with a circular edge, said second part being formed with a conical surface for abutting engagement with said circular edge.

3. A method according to claim 1 wherein said parts are free-cutting steel.

4. A method according to claim 1 wherein said intersecting passages are at right angles to each other.

5. A method according to claim 1 wherein said pipe is bent to a desired shape and welded into position relative to said sound-absorber after being connected to said second part.